United States Patent Office 2,698,848
Patented Jan. 4, 1955

2,698,848

MAKING PYRIDINE DERIVATIVES

John E. Mahan, Bartlesville, Okla., assignor to Phillips Petroleum Company, a corporation of Delaware No Drawing. Application June 26, 1951,
Serial No. 233,686

17 Claims. (Cl. 260—290)

This invention relates to a process for the production of a pyridine derivative containing a $CH_2=C<$ group attached to a carbon atom in the pyridine nucleus. In one of its more specific aspects, it relates to a process for the production of vinylpyridine and its homologues. This invention is particularly applicable to the production of 2-vinylpyridine from 2-picoline.

Pyridine derivatives containing a $CH_2=C<$ group attached to a carbon atom of the pyridine nucleus have many potential uses and would find wide application if readily available. Important among these are their uses as comonomers in polymerization processes. In the particular case of 2-vinylpyridine, its copolymer with butadiene has shown definite promise in the field of synthetic rubber operations. The extension of its use in this important area demands a process for the quantity production of vinylpyridines by an efficient and economical process. Other potential uses include the production of high molecular weight polymers and copolymers of a resinous nature, compounds which might serve as plasticizers, and the like. Most polymers of vinylpyridines are soluble in aqueous acids, thus providing a useful property different from most polymeric materials. Vinylpyridines are finding important use in imparting dyeing characteristics to synthetic fibres made from acrylonitrile polymers and copolymers. Thus, as described in Arnold, 2,491,471 (1949), oriented polymeric materials dyeable with acid dyes are made from copolymers of acrylonitrile and vinylpyridines. Webb, 2,527,863 (1950) forms a dyed structure by blending an acrylonitrile polymer containing at least 85 per cent of acrylonitrile with a polyvinylpyridine in amounts no more than 10 per cent of the acrylonitrile polymer, forms the structure from the resulting blend, and treats the structure with an aqueous bath containing an acid dye. Synthetic fibres of acrylonitrile, containing polymerized vinylpyridines in blended or copolymer form, are now in commercial production.

Vinylpyridines also have potential uses in the production of nitrogen-containing pharmaceuticals, as intermediates in the synthesis of organic dyestuffs, as bases for the production of useful organic chemicals, and other uses which will be apparent to one skilled in the art.

The production of 2-vinylpyridine by condensation of formaldehyde and 2-picoline to form monomethylol-2-picoline and subsequent dehydration of this product is known in the art. As practiced heretofore, the condensation of 2-picoline and formaldehyde is effected noncatalytically and the dehydration of monomethylol-2-picoline accomplished by heating, without a catalyst. The dehydration reaction is accompanied by undesirable polymerization reactions which produce a heavy tarry product with a low yield of 2-vinylpyridine. The reaction proceeds in the following manner:

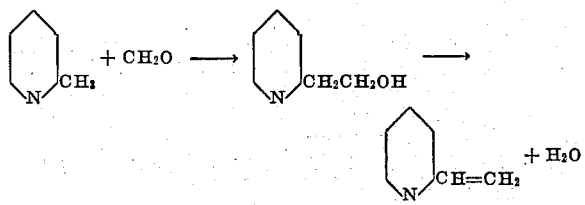

Another disadvantage of this process is the formation of higher condensation products, dimethylol-2-picoline (I) and trimethylol-2-picoline (II), which reduce the yield of monomethylol-2-picoline and subsequently of 2-vinylpyridine. The loss due to formation of these by-

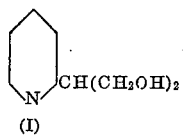    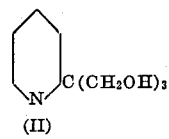
(I)                      (II)

products is large, amounting to as much as 70 per cent of the theoretical yield under some conditions. Obviously the production of 2-vinylpyridine by this method is inefficient and expensive.

Homologues of vinylpyridine, i. e., alkyl substituted vinylpyridines, may be produced in a similar manner. As an example, 2-methyl-5-ethylpyridine may be converted to 2-vinyl-5-ethylpyridine by formation of the monomethylol derivative and subsequent dehydration to 2-vinyl-5-ethylpyridine. This reaction proceeds as follows:

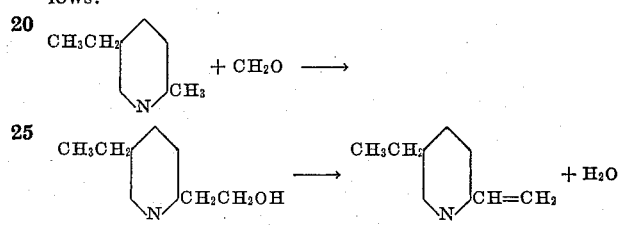

Other homologues of vinylpyridine may be produced in an analogous manner.

The reaction of formaldehyde with an alkyl substituted pyridine with the addition of the hydroxymethyl group to the alpha carbon atom of said alkyl group is known to take place in those instances in which an alkyl group is in the 2-, 4-, or 6-position of the pyridine ring, provided said alpha carbon atom has at least two hydrogen atoms attached thereto. The addition does not take place on alkyl groups in the 3- or 5-positions. The pyridine nucleus may contain other substituents, as, for example, chloro or cyano groups, which do not interfere with the addition of the hydroxymethyl group to the alkyl radical. It is often desirable to employ an alkyl substituted pyridine containing a chloro or cyano group attached to a carbon atom in the pyridine nucleus in the process of the present invention.

In accordance with the present invention, pyridine derivatives containing a $CH_2=C<$ group attached to a carbon atom in the pyridine nucleus, and/or polymers thereof, are produced by the presence of boron trifluoride ($BF_3$), per se or in the form of its complexes, in the dehydration of hydroxyalkyl substituted pyridine derivatives, for example monomethylol-2-picoline, to the corresponding pyridine derivative containing a $CH_2=C<$ group, for example 2-vinylpyridine. By choice of conditions and operating methods, concomitant polymerization of the vinylpyridine compound produced by the dehydration to polymers thereof can be increased or decreased as desired. The process can be carried out, if desired, with a 2-, 4-, or 6-alkylpyridine compound and formaldehyde as starting materials, the $BF_3$ (by which, unless otherwise qualified, I intend to include both $BF_3$ per se and $BF_3$ in the form of its complexes) being added either to these reactants, or added later after the condensation of same to the hydroxyalkylpyridine has been caused to occur by any method. Where $BF_3$ is used to catalyze the condensation of formaldehyde with 2-, 4-, or 6-alkylpyridines to form the corresponding (alpha-hydroxyalkyl) pyridines in accordance with this invention, in most instances very considerable quantities of the latter will be found to undergo concomitant dehydration to the corresponding vinylpyridine derivative.

The present invention is particularly adapted to the production of 2-vinylpyridine and monomethylol-2-picoline from 2-picoline. I have found that 2-vinylpyridine and monomethylol-2-picoline may be economically and efficiently produced by the process of the present invention using a $BF_3$ catalyst to selectively activate the condensation of formaldehyde and 2-picoline to monomethylol-2-picoline substantially without the formation of dimethylol- and trimethylol-picoline and to catalyze the dehydration of monomethylol-2-picoline to 2-vinylpyridine. By the process of this invention it is possible to produce 2-vinylpyridine directly from formaldehyde and 2-picoline by subjecting the effluent from the condensation reaction preferably containing BF₃ catalyst employed in the condensation reaction, to dehydration which effects conversion of the monomethylol-2-picoline to 2-vinylpyridine. BF₃ and its complexes are active catalysts for this dehydration. The 2-vinylpyridine is separated and the unchanged monomethylol-2-picoline recycled to the dehydration zone. The process is also suited to the production of 4-vinylpyridine and monomethylol-4-picoline from 4-picoline in an analogous manner.

In one specific embodiment of the present invention, the process comprises reacting a mixture of 2-picoline with formaldehyde in the presence of a selected catalyst comprising boron trifluoride. The temperature is maintained at a suitable elevated level and agitation furnished throughout the reaction time. The effluent comprises unchanged reactants and monomethylol-2-picoline. Depending on the operating conditions more or less 2-vinylpyridine may be formed by dehydration of a part of the monomethylol-2-picoline by the combined action of the BF₃ and heat in the reactor. The effluent is subjected to fractional distillation. Formaldehyde, and unchanged 2-picoline as a water azeotrope are first separated and recycled to the reaction zone. Heavy ends consisting partly of resinous polymers of 2-vinylpyridine are formed in small amounts which will depend on the reaction conditions and are also removed from the monomethylol-2-picoline. Formation of these polymers may be kept at a minimum by careful control of reaction and fractionation conditions, or can be increased to a great extent if desired as product by increased severity of reaction conditions. Any 2-vinylpyridine formed may be separated at this point if desirable, or it may be passed to the dehydration step with the monomethylol compound.

The various forms of BF₃ which can be used will be discussed hereinafter. Inasmuch as it is within the scope of the present invention to effect the formaldehyde-picoline condensation with catalysts other than BF₃, or in the absence of a catalyst, to form the monomethylol compound, and then use BF₃ to catalyze dehydration of the latter to the vinylpyridine compound, reference is hereby made to my U. S. Patent 2,512,660, granted June 27, 1950, for a description of various catalysts useful in effecting said condensation. According to the patent, preferred catalysts are relatively non-volatile strong mineral acids, anhydrides of these acids, and acid reacting salts. Phosphoric acid, sulfuric acid, and potassium persulfate are particularly effective. Phosphoric acid, and sulfuric acid are preferably employed as concentrated aqueous solutions. The preferred range of concentration for sulfuric acid is 80 to 100 weight per cent and for phosphoric acid, 60 to 100 weight per cent. Acid concentrations of 85 per cent orthophosphoric, and 95 per cent sulfuric are especially suited to the process. Anhydrides of these acids, e. g. phosphorus pentoxide and sulfur trioxide, and alkali metal strong acid reacting salts of these acids, particularly sodium dihydrogen phosphate and potassium persulfate, are effective catalysts for the condensation reaction. The anhydrides are rapidly diluted with water due to the dehydration reaction. Boron trifluoride and alkali metal fluoborates, e. g. sodium fluoborate and potassium fluoborate, are also effective catalysts for the condensation reaction. I have found that these catalysts give definitely higher per-pass yields of the desired product than do non-catalyzed operations. Orthophosphoric acid and potassium persulfate are entirely selective in their action and when used, no higher condensation products are formed, making possible high ultimate yields with these catalysts. When sulfuric acid is employed, small amounts of dimethylol-2-picoline are found in the effluent. Acetic acid-ammonium acetate, zinc chloride, silica-alumina, and hydrochloric acid have been used in test runs and the results obtained were inferior to non-catalyzed operations. Basic catalysts such as Triton B (a quaternary ammonium hydroxide) seem to promote the condensation of formaldehyde with itself which is a source of operational difficulties.

The formaldehyde may be either in anhydrous form or in an aqueous solution. Dilute aqueous solutions of formaldehyde such as the 37 per cent solution of commerce, are suitable for use in the process of the present invention. Formaldehyde used for this reaction may be added in an aqueous solution, as paraformaldehyde, or as trioxane:

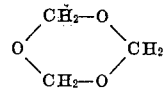

with equally good results. When paraformaldehyde is used, water is added to facilitate separation of unchanged reactants for recycling.

Temperatures employed for the condensation process are in the general range of 200° to 500° F. although 280° to 360° F. will be found most advantageous. As stated, more or less dehydration can also occcur concomitantly with the condensation.

Temperatures employed for the dehydration are in the general range of 150° F. to 500° F., although 200° F. to 300° F. will be found most advantageous.

Pressure requirements are not critical. Satisfactory results are obtained in the range from atmospheric pressure to 500 pounds per square inch. Pressure developed within a reactor in heating from atmospheric temperature will be well within this range. Oftentimes initial pressures below 100 pounds per square inch gauge will be found most convenient.

To minimize polymerization, vinylpyridine product can be removed from the reaction mixture as rapidly as formed by operating the system under distillation conditions. In such case, pressure is advantageously sub-atmospheric, in order to provide temperatures throughout sufficiently low to minimize polymerization. For instance, a distilling column can be attached to a reactor containing or into which are fed monomethylol-2-picoline and BF₃ catalyst, and the system operated at 10 mm. Hg pressure at the top of the distillation column, the 2-vinylpyridine product being continuously distilled off as rapidly as formed. The 2-vinylpyridine distills off at an overhead temperature of about 120° F. at 10 mm. pressure, the reactor temperature of course being higher. By suitable modification, BF₃ catalyst, formaldehyde, and 2-picoline can be continuously charged to a reaction system from which 2-vinylpyridine is continuously removed by distillation.

Suitable reaction time to accomplish the dehydration will depend, among other things on whether a batch reaction is effected with subsequent separation of product, or whether a continuous flow system is used in which the reaction is caused to occur in a heated tube or vessel by continuously passing the reaction mixture therethrough and thence into a flashing or distilling zone for recovery of products. Also, if formaldehyde and alkylpyridine are initial reactants sufficient time for the condensation to occur must be allowed. As a general guide, from 30 seconds to 30 minutes is usually sufficient to effect the dehydration reaction in a continuous flow system. If polymer formation is to be encouraged, longer times are preferred, and a batch reaction will in general provide more polymer. As indicated above, removal of vinylpyridine products from the reaction mixture as soon as formed, and keeping same at as low temperatures as possible, permits high recovery of same in the monomeric form. In any system accomplishing this, the remaining reaction mixture can be held at reaction conditions for several hours without undue effects.

Small but catalytic amounts of BF₃ as such or in the form of its complexes should be used to effect the condensation, the dehydration or the two together. In this connection there is no particular upper limit on amount other than that dictated by economics, keeping in mind that larger catalyst concentrations tend toward greater polymer formation. It will be appreciated that in some instances polymer formation will be desired, while in others where the monomers are wanted as such it will be avoided as much as possible. The lower limit on catalyst concentration is that which will exhibit a catalytic effect in a given situation. Usually the amounts of catalyst chosen are within the range of 0.1 to 5 weight per cent BF₃ based on weight of total reaction mixture. Where the BF₃ is in the form of a complex, sufficient complex is used to give the foregoing quantity of BF₃ calculated as such.

Boron trifluoride is the active catalyst of this invention. It can be introduced to the reactants as boron trifluoride per se, or in the form of its various catalytic complexes. Included in the latter, which are well known to the chemist, are BF₃-hydrates, BF₃-etherates, BF₃-alcoholates, complexes of $BF_3$ with organic acids such as acetic acid, with certain inorganic acids such as phosphoric acid and other phosphorus-containing acids, with organic bases such as the heterocyclic organic bases, e. g. pyridine, picolines, and mono-methylolpicolines. It will be apparent that on introduction of $BF_3$ as such into the reaction mixture, part or all of it may complex with one or more components thereof, e. g. water, alkylpyridine, or hydroxyalkylpyridines. Ordinarily where a complex is to be first made and then used as the catalyst, it can be readily prepared by passing $BF_3$ gas into the complexing material until $BF_3$ is no longer taken up, meanwhile preventing an undue temperature rise. Thus, $BF_3$ can be bubbled into water, while keeping the liquid below say 150° F. by cooling, until the liquid is saturated at atmospheric pressure. The resulting material has the constitution of what can be called $BF_3$ hydrate, i. e. its empirical formula is $BF_3 \cdot H_2O$. If desired, water can be added to give a complex having a water:$BF_3$ mol ratio between 1:1 and 2:1. A similar procedure can be used to complex $BF_3$ with, for example, diethyl ether, ethylalcohol, acetic acid, 85 per cent orthophosphoric acid, pyridine. In some cases the complex is a liquid while in others it is a solid. $BF_3$-pyridine complex is an example of the latter. For a given weight of boron trifluoride, not all forms of the catalyst will give identical results and the various forms are not to be considered exactly equivalent to each other. It is preferred that the $BF_3$ be added in the form of a pre-formed complex.

To minimize polymer formation, if polymers are not desired, a suitable polymerization inhibitor, preferably sulfur although other well known polymerization inhibitors, for example tertiary butylcatechol, hydroquinone, can be present in the reaction mixture and/or added to reaction products before or during distillation thereof.

By way of non-limiting examples, the following compounds can be condensed with formaldehyde in accordance with this invention. Many others will of course be known to those skilled in the art: 2-picoline,4-picoline, 2-methyl-5-ethylpyridine, 4-ethylpyridine, 2-ethylpyridine (forms 2-(alpha-hydroxymethylethyl) pyridine), 3-cyano-2-picoline, 2-methyl-5-chloropyridine, 2,4,5-trimethylpyridine, 2 - n - propyl - 3 - ethyl - 4 - methylpyridine, 2,3,4,5-tetramethylpyridine, 2-ethyl-3-chloro-5-ethylpyridine, 2-methyl-3-nitro-5-methylpyridine, 2,4,6-trimethylpyridine.

*Example I*

Five mols of 2-picoline and 3 mols of formaldehyde, in the form of commercial 37 per cent aqueous formaldehyde were charged into a steel bomb. 5 grams $BF_3$ gas had been passed into and absorbed by the picolines prior to admixture with the formaldehyde. Reaction conditions were chosen which were favorable to formation of 2-vinylpyridine and polymers thereof. The bomb was sealed and then rocked for 3 hours at 312–322° F. One gram of tertiary butyl catechol as a polymerization inhibitor was then added to the total reaction product which was then subjected to analysis by fractional distillation and chemical means. The following yields were obtained:

|  | Yield | |
| --- | --- | --- |
|  | Mol per cent based on Formaldehyde | Grams |
| 2-vinylpyridine | 26.6 |  |
| Monomethylol-2-picoline | 16.8 |  |
| Combined yield 2-vinylpyridine and monomethylol-2-picoline | 43.4 |  |
| Dimethylol-2-picoline | 0 |  |
| Pot residue after distillation, largely polyvinylpyridine |  | 52.5 |

*Example II*

Monomethylol-2-picoline was dehydrated in a run wherein 2-vinylpyridine product was continuously removed from the reaction mixture substantially as rapidly as formed. This was done by effecting the reaction in a kettle to which was attached a distillation column about 20 mm. in diameter and containing 10 inches of glass helices as packing.

$BF_3$ gas was passed over the surface of chilled pyridine until the material formed white crystals of pyridine-$BF_3$ complex. The crystals were washed with benzene and dried.

The kettle-reactor was charged with monomethylol-2-picoline and 4.3 wt. per cent of the complex (2.0 wt. per cent $BF_3$ assuming the complex to contain $BF_3$ and pyridine in a mol ratio of 1:1). The system was maintained at 10 mm. Hg pressure, the kettle heated to reaction temperature and 2-vinyl-pyridine product was removed as overhead product at 126–131° F. A reflux ratio of 20:1 was employed in the column.

During the run some polyvinylpyridine was formed and remained in the kettle. All the contents of the kettle at the end of the run were soluble in dilute aqueous hydrochloric acid.

I claim:

1. A process for the production of a pyridine derivative containing a $CH_2=C<$ group attached to a carbon atom in the pyridine nucleus which comprises reacting an alkylpyridine selected from the group consisting of 2-, 4-, and 6-alkylpyridine derivatives with formaldehyde at a temperature within the range of from 200° F. to 500° F. in the presence of small but catalytic amounts of a catalyst comprising boron trifluoride as an active constituent thereof, thereby forming the corresponding hydroxyalkyl pyridine, and subjecting the resulting total reaction mixture to sufficient heating to convert said hydroxyalkyl pyridine therein by dehydration reaction to the corresponding pyridine derivative containing a $CH_2=C<$ group.

2. A process for the production of 2-vinylpyridine which comprises reacting 2-picoline with formaldehyde at a temperature within the range of from 200° F. to 500° F. in the presence of small but catalytic amounts of boron trifluoride, thereby forming monomethylol-2-picoline, and subjecting the resulting total reaction mixture to sufficient heating to convert said monomethylol-2-picoline therein by dehydration reaction to 2-vinylpyridine.

3. A process for the production of 2-vinylpyridine which comprises reacting 2-picoline with formaldehyde at a temperature within the range of from 200° F. to 500° F. in the presence of small but catalytic amounts of boron trifluoride added as such, thereby forming monomethylol-2-picoline, and subjecting the resulting total reaction mixture to sufficient heating to convert said monomethylol-2-picoline therein by dehydration reaction to 2-vinylpyridine.

4. A process for the production of 2-vinylpyridine which comprises reacting 2-picoline with formaldehyde at a temperature within the range of from 200° F. to 500° F. in the presence of small but catalytic amounts of boron trifluoride added as a pre-formed complex, thereby forming monomethylol-2-picoline, and subjecting the resulting total reaction mixture to sufficient heating to convert said monomethylol-2-picoline therein by dehydration reaction to 2-vinylpyridine.

5. A process for the production of 2-vinylpyridine which comprises reacting 2-picoline with formaldehyde at a temperature within the range of from 200° F. to 500° F. in the presence of small but catalytic amounts of a catalyst comprising boron trifluoride as an active constituent thereof, thereby forming monomethylol-2-picoline, and subjecting the resulting total reaction mixture to sufficient heating to convert said monomethylol-2-picoline therein by dehydration reaction to 2-vinylpyridine.

6. A process for the production of monomethylol-2-picoline which comprises reacting 2-picoline with formaldehyde at a temperature within the range of from 200° F. to 500° F. in the presence of small but catalytic amounts of a catalyst comprising boron trifluoride as an active constituent thereof, thereby forming monomethylol-2-picoline.

7. A process for the production of monomethylol-2-picoline which comprises reacting 2-picoline with formaldehyde at a temperature within the range of from 280° F. to 360° F. in the presence of small but catalytic amounts of a catalyst comprising boron trifluoride as an active constituent thereof, thereby forming monomethylol-2-picoline.

8. A process for the production of vinylpyridine which comprises reacting a picoline selected from the group consisting of 2-picoline and 4-picoline with formaldehyde at a temperature within the range of from 200° F. to 500° F.

in the presence of small but catalytic amounts of a catalyst comprising boron trifluoride as an active constituent thereof, thereby forming the corresponding monomethylol picoline, and subjecting the resulting total reaction mixture to sufficient heating to convert said monomethylol picoline therein by dehydration reaction to the corresponding vinylpyridine.

9. A process for the production of a hydroxy alkylpyridine which comprises reacting an alkylpyridine selected from the group consisting of 2-, 4-, and 6-alkylpyridine derivatives with formaldehyde at a temperature within the range of from 200° F. to 500° F. in the presence of small but catalytic amounts of a catalyst comprising boron trifluoride as an active constituent thereof, thereby forming the corresponding hydroxy alkylpyridine.

10. A process for the production of a hydroxy alkylpyridine which comprises reacting an alkylpyridine selected from the group consisting of 2-, 4-, and 6-alkylpyridine derivatives with formaldehyde at a temperature within the range of from 200° F. to 500° F. in the presence of small but catalytic amounts of boron trifluoride added as a pre-formed complex, thereby forming the corresponding hydroxy alkylpyridine.

11. A process for the production of a hydroxy alkylpyridine which comprises reacting an alkylpyridine selected from the group consisting of 2-, 4-, and 6-alkylpyridine derivatives with formaldehyde at a temperature within the range of from 200° F. to 500° F. in the presence of small but catalytic amounts of a complex of boron trifluoride and a pyridine compound, thereby forming the corresponding hydroxy alkylpyridine.

12. A process for the production of a pyridine derivative containing a $CH_2=C<$ group attached to a carbon atom in the pyridine nucleus which comprises subjecting an (alphahydroxyalkyl) pyridine selected from the group consisting of 2-, 4-, and 6-(alphahydroxyalkyl)pyridine derivatives to dehydration reaction at a temperature within the range of 150 to 500° F. in the presence of small but catalytic amounts of a catalyst comprising boron trifluoride as an active constituent thereof.

13. In the dehydration of 2-, 4-, and 6-(alphahydroxyalkyl)pyridine derivatives to the corresponding compounds containing a $CH_2=C<$ group attached to a carbon atom in the pyridine nucleus, the improvement which comprises employing boron trifluoride as catalyst for said dehydration.

14. A process for making a vinylpyridine compound which comprises heating, in contact with a catalyst comprising boron trifluoride as an active ingredient thereof, a hydroxyalkylpyridine compound dehydrateable to a corresponding vinylpyridine compound, at a temperature effective to dehydrate same, while continuously distilling from the reaction mixture the vinylpyridine compound substantially as rapidly as formed.

15. A process according to claim 14 wherein a polymerization inhibitor is present in the reaction mixture.

16. A process which comprises dehydrating monomethylol-2-picoline in the presence of a $BF_3$ catalyst, and recovering resulting 2-vinylpyridine.

17. A process which comprises dehydrating a compound selected from the group consisting of 2-, 4-, and 6-(alphahydroxyethyl)pyridines in the presence of a $BF_3$ catalyst, and recovering resulting 2-vinylpyridine.

References Cited in the file of this patent

UNITED STATES PATENTS

| Number | Name | Date |
|---|---|---|
| 2,512,660 | Mahan | June 27, 1950 |
| 2,534,285 | Mahan | Dec. 19, 1950 |